US012700987B2

(12) United States Patent
Griffin et al.

(10) Patent No.: US 12,700,987 B2
(45) Date of Patent: Aug. 4, 2026

(54) DETERMINING RESISTANCE OF A CLASSICAL ALGORITHM TO A QUANTUM BREACH ATTEMPT

(71) Applicant: Red Hat, Inc., Raleigh, NC (US)

(72) Inventors: Leigh Griffin, Waterford (IE); Stephen Coady, Dublin (IE)

(73) Assignee: Red Hat, LLC, Raleigh, NC (US)

( * ) Notice: Subject to any disclaimer, the term of this patent is extended or adjusted under 35 U.S.C. 154(b) by 89 days.

(21) Appl. No.: 18/933,731

(22) Filed: Oct. 31, 2024

(65) Prior Publication Data

US 2026/0121826 A1     Apr. 30, 2026

(51) Int. Cl.
*H04L 9/00*          (2022.01)
*H04L 9/08*          (2006.01)

(52) U.S. Cl.
CPC ............ *H04L 9/002* (2013.01); *H04L 9/0852* (2013.01)

(58) Field of Classification Search
CPC .............................. H04L 9/002; H04L 9/0852
USPC .............................................................. 380/1
See application file for complete search history.

(56) References Cited

U.S. PATENT DOCUMENTS

| | | | | |
|---|---|---|---|---|
| 11,764,953 | B1 * | 9/2023 | Shea ..................... | H04L 63/166 |
| | | | | 713/168 |
| 12,200,107 | B1 * | 1/2025 | Shea ..................... | H04L 9/0838 |
| 12,200,116 | B1 * | 1/2025 | Rao ........................ | H04L 9/0852 |
| 12,470,376 | B2 * | 11/2025 | Saarinen ............... | H04L 9/0897 |
| 2013/0332744 | A1 | 12/2013 | Zhuang | |

| | | | | |
|---|---|---|---|---|
| 2023/0254132 | A1 * | 8/2023 | Ramanathan ......... | H04L 9/0869 |
| | | | | 380/28 |
| 2024/0273221 | A1 * | 8/2024 | Shea ...................... | G06N 10/00 |
| 2024/0333478 | A1 * | 10/2024 | Shim ...................... | H04L 9/3263 |
| 2024/0340169 | A1 * | 10/2024 | Coventry, III ........ | H04L 9/0631 |
| 2024/0364538 | A1 * | 10/2024 | Maganti ................ | H04L 9/0841 |
| 2024/0411874 | A1 * | 12/2024 | Ramanathan ......... | H04L 9/3263 |
| 2025/0080334 | A1 * | 3/2025 | Saarinen ............... | H04L 9/0852 |
| 2025/0184132 | A1 * | 6/2025 | Rao ........................ | G06N 10/80 |
| 2025/0259085 | A1 * | 8/2025 | Crabtree ................ | G06N 5/043 |

FOREIGN PATENT DOCUMENTS

CN          109684792 A      4/2019

OTHER PUBLICATIONS

Swapnali N Tambe-Jagtap, "A Survey of Cryptographic Algorithms in Cybersecurity: From Classical Methods to Quantum-Resistant Solutions" Jan. 1, 2023.*
Extended European Search Report for EP Patent Application No. 24219561.8, dated Jun. 2, 2025, 5 pages.

* cited by examiner

*Primary Examiner* — Samson B Lemma
(74) *Attorney, Agent, or Firm* — Dority & Manning, P.A.

(57)          ABSTRACT

A computing system obtains a set of instructions configured to execute on a classical computing system. The set of instructions are evaluated to identify a cryptographic algorithm having a cryptographic algorithm type implemented by the set of instructions. Based on the cryptographic algorithm type, a candidate quantum algorithm comprising quantum instructions operable to attempt to breach the cryptographic algorithm is selected from a plurality of quantum algorithms. The set of instructions are translated into cryptographic quantum instructions that implement the cryptographic algorithm. Based on the cryptographic quantum instructions and the quantum instructions, a quantum instruction file is generated that, when executed, attempts to breach the cryptographic algorithm.

17 Claims, 4 Drawing Sheets

DETERMINING RESISTANCE OF A CLASSICAL ALGORITHM TO A QUANTUM BREACH ATTEMPT

BACKGROUND

Algorithms that have been thought to be extremely secure have been breached in a relatively short period of time by a quantum algorithm executing on a quantum computing system.

SUMMARY

The examples disclosed herein determine the resistance of a classical algorithm to a quantum breach attempt.

In one implementation, a method is provided. The method includes obtaining, by a computing system including one or more processor devices, a set of instructions configured to execute on a classical computing system. The method further includes evaluating, by the computing system, the set of instructions to identify a cryptographic algorithm having a cryptographic algorithm type implemented by the set of instructions. The method further includes selecting, based on the cryptographic algorithm type, by the computing system, a candidate quantum algorithm including quantum instructions operable to attempt to breach the cryptographic algorithm. The method further includes translating, by the computing system, the set of instructions into cryptographic quantum instructions that implement the cryptographic algorithm. The method further includes generating, based on the cryptographic quantum instructions and the quantum instructions, by the computing system, a quantum instruction file that, when executed, attempts to breach the cryptographic algorithm.

In another implementation, a computing device is provided. The computing device includes a memory, and a processor device coupled to the memory. The processor device is to obtain a set of instructions configured to execute on a classical computing system. The processor device is further to evaluate the set of instructions to identify a cryptographic algorithm having a cryptographic algorithm type implemented by the set of instructions. The processor device is further to select, based on the cryptographic algorithm type, a candidate quantum algorithm from a plurality of quantum algorithms, the candidate quantum algorithm including quantum instructions operable to attempt to breach the cryptographic algorithm. The processor device is further to translate the set of instructions into cryptographic quantum instructions that implement the cryptographic algorithm. The processor device is further to generate, based on the cryptographic quantum instructions and the quantum instructions, a quantum instruction file that, when executed, attempts to breach the cryptographic algorithm.

In another implementation, a non-transitory computer-readable storage medium is provided. The non-transitory computer-readable storage medium includes executable instructions to cause a processor device to obtain a set of instructions configured to execute on a classical computing system. The instructions further cause the processor device to evaluate the set of instructions to identify a cryptographic algorithm having a cryptographic algorithm type implemented by the set of instructions. The instructions further cause the processor device to select, based on the cryptographic algorithm type, a candidate quantum algorithm from a plurality of quantum algorithms, the candidate quantum algorithm including quantum instructions operable to attempt to breach the cryptographic algorithm. The instructions further cause the processor device to translate the set of instructions into cryptographic quantum instructions that implement the cryptographic algorithm. The instructions further cause the processor device to generate, based on the cryptographic quantum instructions and the quantum instructions, a quantum instruction file that, when executed, attempts to breach the cryptographic algorithm.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
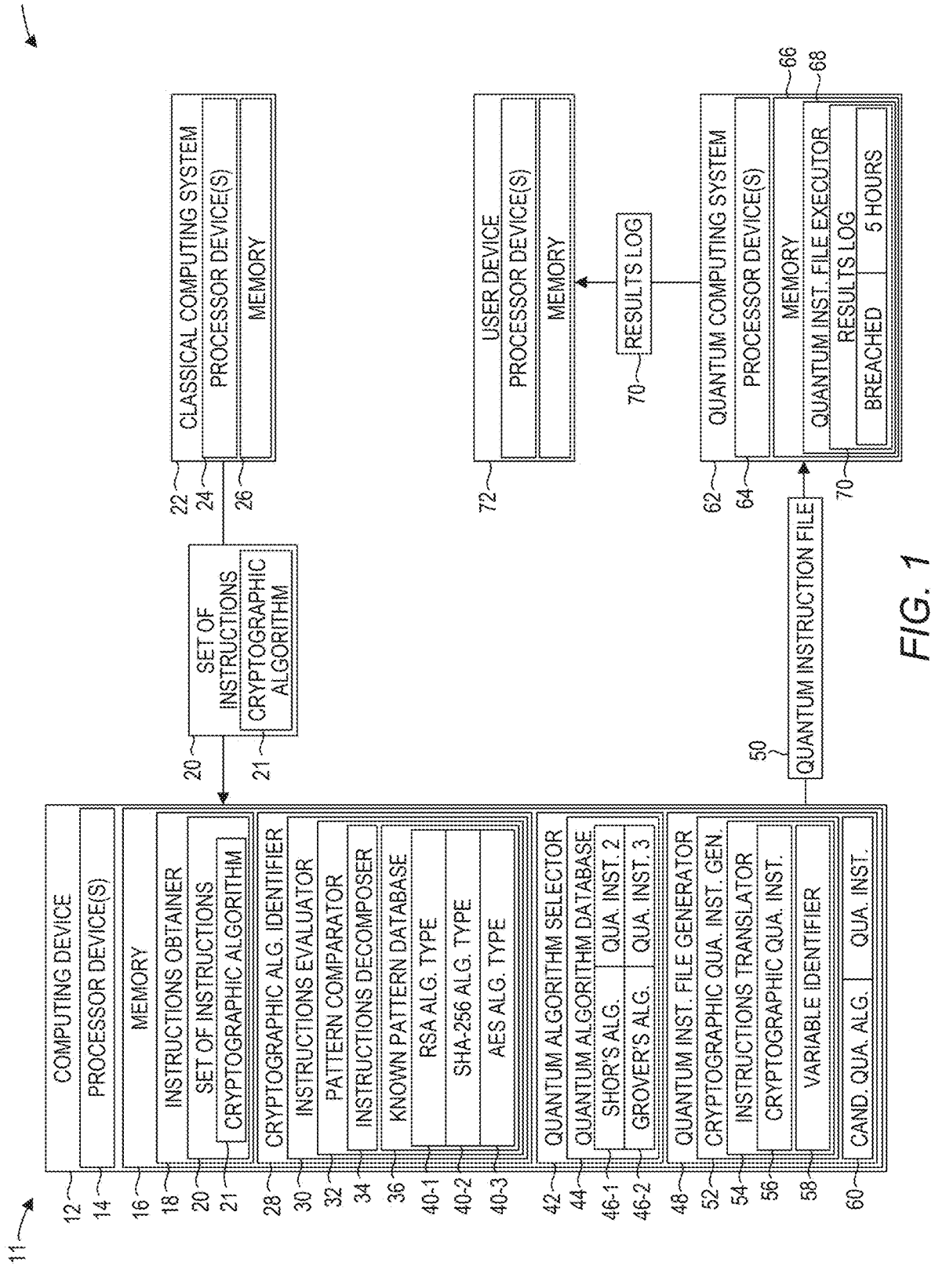
FIG. 1 is a block diagram of a computing environment for determining the resistance of a classical algorithm to a quantum breach attempt according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Quantum computing systems may be utilized to breach classical computer algorithms in a fraction of the time that it would take a classical computer to do so. For example, quantum computing systems may be capable of performing a cryptanalytic attack on public-key algorithms containing private key information associated with one or more individuals/entities to quickly derive the private key. Given the rise of quantum computing, it may be desirable to ensure classical algorithms are sufficiently secure to reduce or prevent the breach of such classical algorithms by quantum computing systems. Ensuring the security of classical algorithms may be especially important with respect to cryptographic algorithms that contain sensitive information where breaching of these cryptographic algorithms by quantum computing systems would be extremely problematic.

The examples disclosed herein implement mechanisms for determining the resistance of a classical algorithm to a quantum breach attempt. A set of instructions configured to execute on a classical computing system is obtained. The set of instructions are evaluated to identify a cryptographic algorithm having a cryptographic algorithm type implemented by the set of instructions. Based on the cryptographic algorithm type, a candidate quantum algorithm is selected from a plurality of quantum algorithms. The candidate quantum algorithm includes quantum instructions operable to attempt to breach the cryptographic algorithm. The set of instructions are translated into cryptographic quantum instructions that implement the cryptographic algorithm. A quantum instruction file (QIF) is generated based on the cryptographic quantum algorithm and the quantum instructions and executed in an attempt to breach the cryptographic algorithm.

The examples, among other advantages, determine the resistance of a classical algorithm to a quantum breach attempt. The examples provide an improvement in computer technology, specifically by facilitating the creation of secure algorithms that are resistant to being breached by a quantum algorithm.

FIG. 1 is a block diagram of an environment 10 in which determining the resistance of a classical algorithm to a quantum breach can be practiced according to some implementations of the present disclosure. The environment 10 includes a computing system 11 that includes one or more computing devices 12. The computing device 12 includes processor device(s) 14 and a memory 16. While for purposes of illustration data may be described as being located in the memory 16, it will be appreciated that such data may be stored in a non-transitory storage device (not illustrated) rather than the memory 16, or moved from such a storage device to the memory 16 as needed.

The memory 16 can include an instructions obtainer 18. The instructions obtainer 18 can perform various operations to obtain algorithmic instructions. In particular, the instructions obtainer 18 can obtain a set of instructions 20 from a classical computing system 22. In some implementations, the set of instructions 20 are configured to execute on the classical computing system 22. The classical computing system 22 can include one or more processor device(s) 24 and a memory 26. The classical computing system 22 can be any type or manner of classical computing device, such as a smartphone, a laptop, a desktop computing device, or any other type of classical computing device implementing binary computing. In some implementations, to ensure the security of the computing device 12, the classical computing system 22 can be an intermediary for another classical computing system that uses the set of instructions 20. In some implementations, the set of instructions 20 implements a cryptographic algorithm 21. In some implementations, the cryptographic algorithm 21 can be a classical cryptographic algorithm.

The memory 16 can include a cryptographic algorithm identifier 28. The cryptographic algorithm identifier 28 can identify the cryptographic algorithm 21 implemented by the set of instructions 20. The cryptographic algorithm 21 can have a cryptographic algorithm type. By way of non-limiting example, the cryptographic algorithm type can be a Rivest-Shamir-Adleman (RSA) algorithm type, a Secure Hash Algorithm 256-bit (SHA-256) algorithm type, or an Advanced Encryption Standard (AES) algorithm type. One of ordinary skill in the art will appreciate that the possible cryptographic algorithm type of the cryptographic algorithm 21 is not limited to any particular cryptographic algorithm type.

In some implementations the cryptographic algorithm identifier 28 includes an instructions evaluator 30 that is operable to identify the cryptographic algorithm. The instructions evaluator 30 can evaluate the set of instructions 20 using a pattern comparator 32. The pattern comparator 32 can include an instructions decomposer 34 that is operable to decompose the set of instructions 20 to determine the cryptographic algorithm type implemented by the set of instructions 20. By way of non-limiting example, the instructions decomposer 34 can decompose the set of instructions 20 into individual steps performed by the set of instructions 20. In this example, the individual steps form a pattern, and the pattern is indicative of a cryptographic algorithm type, such as an RSA algorithm type, an SHA-256 algorithm type, or an AES algorithm type. The pattern comparator 32 can include or be communicatively coupled to a known pattern database 36. The known pattern database 36 can include a plurality of patterns for a plurality of cryptographic algorithm types, including, but not limited to, an RSA algorithm type 40-1, a SHA-256 algorithm type 40-2, and an AES algorithm type 40-3. The pattern comparator 32 can compare the pattern of the set of instructions 20 with patterns stored in the known pattern database 36. In some implementations, the pattern comparator 32 can compare the pattern of the set of instructions 20 with each of the patterns stored in the known pattern database 36 to determine the cryptographic algorithm type to which the pattern of the set of instructions 20 is most closely related. The pattern comparator 32 can produce a similarity score for each of the patterns in the known pattern database 36 to which the pattern of the set of instructions 20 are compared based on a similarity between the patterns in the known pattern database 36 and the pattern of the set of instructions 20. The similarity score can range from 0% to 100%. The pattern comparator 32 can determine the cryptographic algorithm type of the set of instructions 20 based on the highest similarity score.

By way of non-limiting example, the pattern comparator 32 can compare the pattern of the set of instructions 20 with the RSA algorithm type 40-1, the SHA-256 algorithm type 40-2, and the AES algorithm type 40-3. If the pattern comparator 32 produces a similarity score of 90% for the RSA algorithm type 40-1, a similarity of 80% for the SHA-256 algorithm type pattern 40-2, and a similarity score of 70% for the AES algorithm type 40-3, then the pattern comparator 32 determines that the pattern of the set of instructions 20 are most closely related to the RSA algorithm type 40-1. Based on the cryptographic algorithm type determination made by the pattern comparator 32, the cryptographic algorithm identifier 28 can identify the set of instructions 20 as implementing an RSA type cryptographic algorithm.

In some implementations, the memory 16 includes a quantum algorithm selector 42. Based on the cryptographic algorithm type identified by the cryptographic algorithm identifier 28, the quantum algorithm selector 42 can select a suitable quantum algorithm to determine the resistance of the cryptographic algorithm 21 to a quantum breach attempt. In some implementations, the quantum algorithm selector 42 accesses a quantum algorithm database 44. The quantum algorithm database 44 can contain a plurality of quantum algorithms containing quantum instructions. By way of non-limiting example, the quantum algorithms can include a Shor's algorithm 46-1 having a first set of quantum instructions and a Grover's algorithm 46-2 having a second set of quantum instructions. The quantum algorithm selected by the quantum algorithm selector 42 contains quantum instructions that are operable to attempt to breach the cryptographic algorithm 21. In some implementations, the quantum algorithm database 44 is stored and maintained separately from the computing device 12. In some implementations, the computing device 12 stores and maintains the quantum algorithm database 44 locally.

By way of non-limiting example, if the cryptographic algorithm identifier 28 has identified the set of instructions 20 as an RSA algorithm type, then the quantum algorithm selector 42 can access the quantum algorithm database 44 to select the Shor's algorithm 46-1 having the first set of quantum instructions operable to attempt to breach the cryptographic algorithm 21. Additionally, or alternatively, If the cryptographic algorithm identifier 28 has identified the set of instructions 20 as either a SHA-256 algorithm type or AES algorithm type, then the quantum algorithm selector 42 can access the quantum algorithm database 44 to select the Grover's algorithm 46-2 having the second set of quantum instructions operable to attempt to breach the cryptographic algorithm 21 implemented by the set of instructions 20.

The memory 16 can include a quantum instruction file (QIF) generator 48. The QIF generator 48 can generate a QIF 50 that, when executed, attempts to breach the cryptographic algorithm 21. In some implementations, the QIF generator 48 includes a cryptographic quantum instruction generator 52. The cryptographic quantum instruction generator 52 can include an instructions translator 54 that translates the set of instructions 20 into cryptographic quantum instructions 56. The cryptographic quantum instructions 56 implement the cryptographic algorithm 21.

In some implementations, the instructions translator 54 includes a variable identifier 58. The variable identifier 58 can identify one or more variables utilized by the set of instructions 20. By way of non-limiting example, the variable identifier 58 can identify one or more input variables within the set of instructions 20. Based on the one or more variables identified by the variable identifier 58, the instructions translator 54 can generate the cryptographic quantum instructions 56 to utilize the one or more input variables.

The QIF generator 48 generates the QIF 50 based on the cryptographic quantum instructions 56 and a candidate quantum algorithm 60 having a set of quantum instructions operable to attempt to breach the cryptographic algorithm 21 implemented by the QIF 50. In some implementations, the candidate quantum algorithm 60 is the quantum algorithm selected by the quantum algorithm selector 42 based on the cryptographic algorithm type of the cryptographic algorithm 21. By way of non-limiting example, the candidate quantum algorithm 60 may be the Shor's algorithm 46-1, the Grover's algorithm 46-2, or any other quantum algorithm in the quantum algorithm database 44. The QIF 50 can be used to determine the resistance of the cryptographic algorithm 21 implemented by the set of instructions 20 to a quantum breach attempt. The QIF 50 includes the cryptographic algorithm 21 by way of the cryptographic quantum instructions 56. The QIF 50 also includes the candidate quantum algorithm 60 to interact with the cryptographic quantum instructions 56. More specifically, when the QIF 50 is executed, the candidate quantum algorithm 60 attempts to breach the cryptographic algorithm 21 implemented by the cryptographic quantum instructions 56.

In some implementations, the computing device 12 can cause a quantum computing system 62 to execute the QIF 50 to determine the resistance of the cryptographic algorithm 21 to a quantum breach attempt. The quantum computing system 62 can include processor device(s) 64 and a memory 66. In some implementations, the computing device 12 is a classical computing system that sends the QIF 50 to the quantum computing system 62. In some implementations, the computing device 12 comprises a quantum computing system. In such implementations the computing device 12 can cause a quantum computing system to execute the QIF 50 by simply executing the QIF 50.

The memory 66 can include a QIF executor 68. The QIF executor 68 can execute the QIF 50. In implementations where the computing device 12 is a quantum computing system, the computing device 12 may include the QIF executor 68 and the QIF 50 can be executed by the computing device 12. In some implementations, while executing the QIF 50, the QIF executor 68 can determine whether the cryptographic algorithm 21 was breached. The QIF executor 68 can generate a results log 70. The results log 70 can include information that is indicative of whether the cryptographic algorithm 21 was breached. In some implementations, the results log 70 can include information that indicates that the cryptographic algorithm 21 has been breached. In some implementations, where the cryptographic algorithm 21 has been breached, the results log 70 can also identify an amount of time required to breach the cryptographic algorithm 21. In some implementations, the QIF executor 68 can run for a predetermined maximum period of time, such as 1 hour, 5 hours, 1 day, 1 week, 1 month, or the like. The QIF executor 68 may set the predetermined maximum period of time automatically, or an operator may set the predetermined maximum period of time. If the QIF 50 does not breach the cryptographic algorithm 21 within the predetermined maximum period of time, then the results log 70 can include information indicating that the cryptographic algorithm 21 has not been breached within the predetermined maximum period of time. The predetermined maximum period of time can be identified in the results log 70.

For example, if the QIF executor 68 ran for five hours, resulting in the breach of the cryptographic algorithm 21, the results log 70 can include information indicating that five hours were required to breach the cryptographic algorithm 21. The quantum computing system 62 can send the results log 70 to a destination, such as a display device, a user device 72, or any other suitable or desirable destination.

With this background, an example of a quantum-resistant algorithm validation system will be discussed. Assume that the instructions obtainer 18 obtains the set of instructions 20 from the classical computing system 22. The set of instructions 20 are configured to execute on the classical computing system 22. The cryptographic algorithm identifier 28 identifies the cryptographic algorithm 21 having a cryptographic algorithm type that is implemented by the set of instructions 20.

The instructions evaluator 30 evaluates the set of instructions 20. In particular, the pattern comparator 32 compares the set of instructions 20 with the algorithm type patterns in the known pattern database 36. To do so, the instructions decomposer 34 decomposes the set of instructions 20 into individual steps performed by the set of instructions 20 so that the individual steps are the pattern of the set of instructions 20. The pattern comparator 32 then compares the pattern of the set of instructions 20 with the algorithm type patterns from the known pattern database 36. In this example, the pattern comparator 32 compares the pattern of the set of instructions 20 with the RSA algorithm type 40-1, the SHA-256 algorithm type pattern 40-2, and the AES algorithm type pattern 40-3. The pattern comparator 32 produces a similarity score for each of the algorithm types to which the pattern of the set of instructions 20 is compared. In this example, the pattern comparator 32 produces a similarity score of 90% for the RSA algorithm type 40-1, a similarity score of 80% for the SHA-256 algorithm type pattern 40-2, and a similarity score of 70% for the AES algorithm type pattern 40-3. Since the RSA algorithm type 40-1 has the highest similarity score when compared to the pattern of the set of instructions, the pattern comparator 32 determines that the pattern of the set of instructions 20 to be an RSA algorithm type. The cryptographic algorithm identifier 28 identifies the set of instructions 20 to implement a cryptographic algorithm having an RSA algorithm type.

The quantum algorithm selector 42 selects a suitable quantum algorithm to attempt to breach the cryptographic algorithm 21 implemented by the set of instructions 20 based on the cryptographic algorithm type of the cryptographic algorithm identified by the cryptographic algorithm identifier 28. In this example, the quantum algorithm selector 42 accesses the quantum algorithm database 44 to obtain the candidate quantum algorithm 60. Since the cryptographic algorithm 21 has been identified as an RSA algorithm type, the quantum algorithm selector 42 selects the Shor's algorithm 46-1 having a set of instructions operable to attempt to breach the cryptographic algorithm 21 as the candidate quantum algorithm 60.

The instructions translator 54 translates the set of instructions 20 into cryptographic quantum instructions 56. The cryptographic quantum instructions 56 implement the cryptographic algorithm 21 implemented by the set of instructions 20. The QIF generator 48 then generates the QIF 50 based on the cryptographic quantum instructions 56 and the candidate quantum algorithm 60. The QIF 50, when executed, attempts to breach the cryptographic algorithm 21 implemented by the cryptographic quantum instructions 56, and thus determine the resistance of the cryptographic algorithm 21 implemented by the set of instructions 20 to a quantum breach attempt.

The computing device 12 sends the QIF 50 to the quantum computing system 62 to cause the quantum computing system 62 to execute the QIF 50. The QIF executor 68 executes the QIF 50. Assuming the cryptographic algorithm 21 has been breached, the QIF executor 68 generates a results log 70 containing information indicating that the cryptographic algorithm 21 has been breached and the amount of time required to breach the cryptographic algorithm 21. The quantum computing system 62 then sends the results log 70 to the user device 72, so that the developers of the set of instructions 20 can determine how best to revise the set of instructions to provide better quantum-resistance to the cryptographic algorithm 21 implemented by the set of instructions 20.

Conversely, if the QIF executor 68 executes the QIF 50 for a predetermined period of time, and the cryptographic algorithm 21 has not been breached by the QIF 50 within the predetermined period of time, then the QIF executor 68 generates a results log 70 containing information indicating that the cryptographic algorithm 21 has not been breached within the predetermined period of time.

It is noted that, because the cryptographic algorithm identifier 28, the quantum algorithm selector 42 and the (QIF) generator 48 are components of the computing device 12, functionality implemented by the cryptographic algorithm identifier 28, the quantum algorithm selector 42 and/or the (QIF) generator 48 may be attributed to the computing device 12 generally. Moreover, in examples where the cryptographic algorithm identifier 28, the quantum algorithm selector 42 and/or the (QIF) generator 48 comprise software instructions that program the processor device(s) 14 to carry out functionality discussed herein, functionality implemented by the cryptographic algorithm identifier 28, the quantum algorithm selector 42 and/or the (QIF) generator 48 may be attributed herein to the processor device(s) 14.

Figure 2:
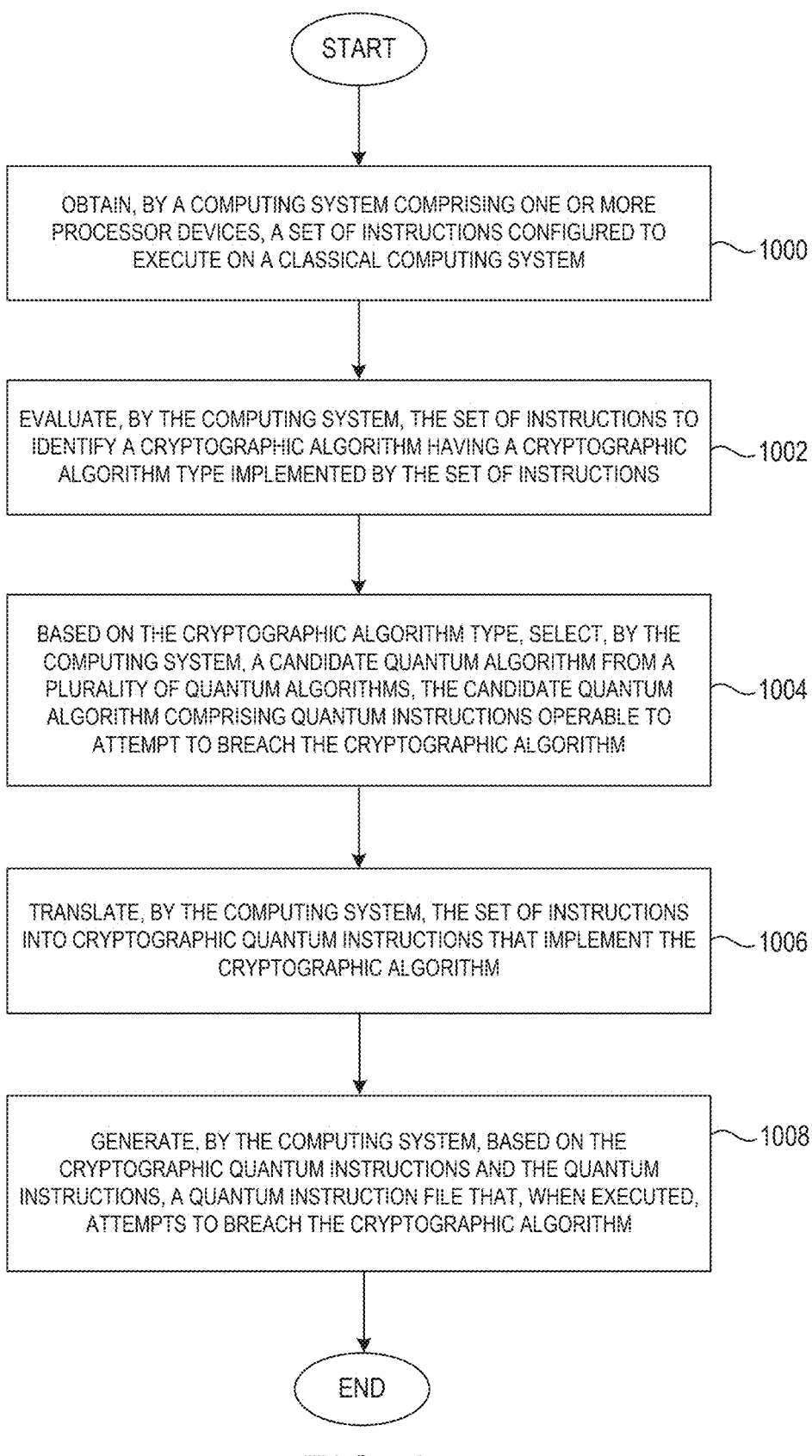
FIG. 2 is a flowchart of a method for determining the resistance of a classical algorithm to a quantum breach according to some implementations.

FIG. 2 is a flowchart of a method for validating a quantum-resistant algorithm according to some implementations. FIG. 2 will be discussed in conjunction with FIG. 1. The computing device 12 obtains the set of instructions 20 configured to execute on the classical computing system 22 (FIG. 2, block 1000). The computing device 12 evaluates the set of instructions 20 to identify the cryptographic algorithm 21 having the cryptographic algorithm type implemented by the set of instructions 20 (FIG. 2, block 1002). Based on the cryptographic algorithm type, the computing device 12 selects the candidate quantum algorithm 60 from the plurality of quantum algorithms, the candidate quantum algorithm 60 comprising quantum instructions operable to attempt to breach the cryptographic algorithm 21. (FIG. 2, block 1004). The computing device 12 translates the set of instructions 20 into the cryptographic quantum instructions 56 that implement the cryptographic algorithm 21 (FIG. 2, block 1006). Based on the cryptographic quantum instructions 56 and the quantum instructions, the computing device 12 generates the quantum instruction file 50 that, when executed, attempts to breach the cryptographic algorithm 21 (FIG. 2, block 1008).

Figure 3:
FIG. 3 is a simplified diagram of the environment illustrated in FIG. 1 according to one implementation.
Figure 3:
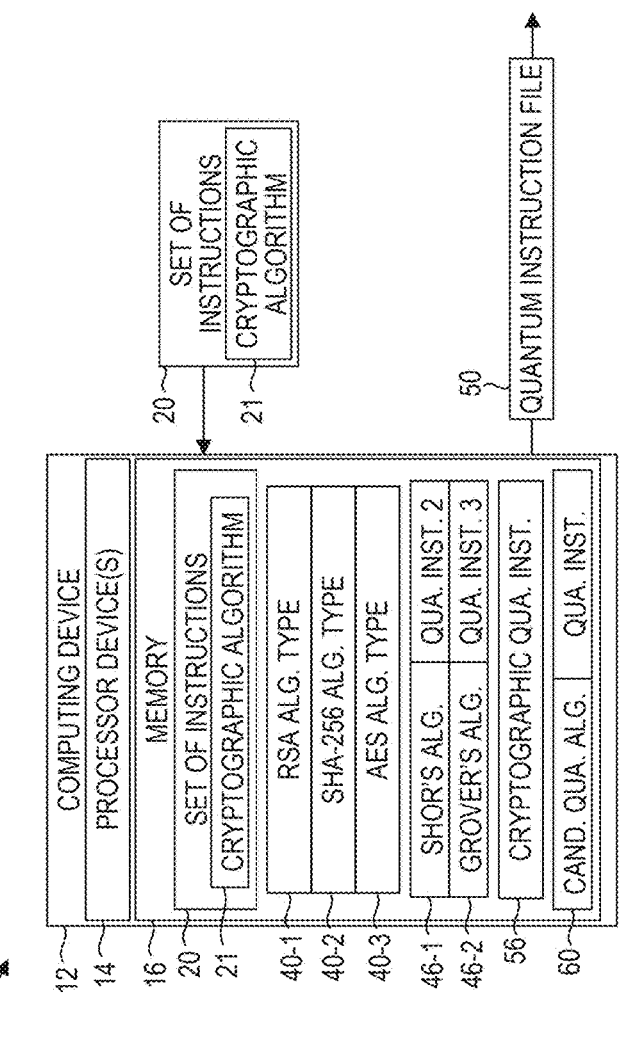

FIG. 3 is a simplified diagram of the environment 10 illustrated in FIG. 1 according to one implementation. The environment 10 includes the memory 16 and the processor device 14 coupled to the memory 16. The processor device 14 is to obtain the set of instructions 20 configured to execute on a classical computing system. The processor device 14 is further to evaluate the set of instructions 20 to identify the cryptographic algorithm 21 having the cryptographic algorithm type 40-1 implemented by the set of instructions 20. The processor device 14 is further to, based on the cryptographic algorithm type 40-1, select the candidate quantum algorithm 46-1 from the plurality of quantum algorithms 46-1 - 46-2, the candidate quantum algorithm 46-1 comprising quantum instructions operable to attempt to breach the cryptographic algorithm 21. The processor device 14 is further to translate the set of instructions 20 into the cryptographic quantum instructions 56 that implement the cryptographic algorithm 21, and generate, based on the cryptographic quantum instructions 56 and the quantum instructions, the quantum instruction file 50 that, when executed, attempts to breach the cryptographic algorithm 21.

Figure 4:
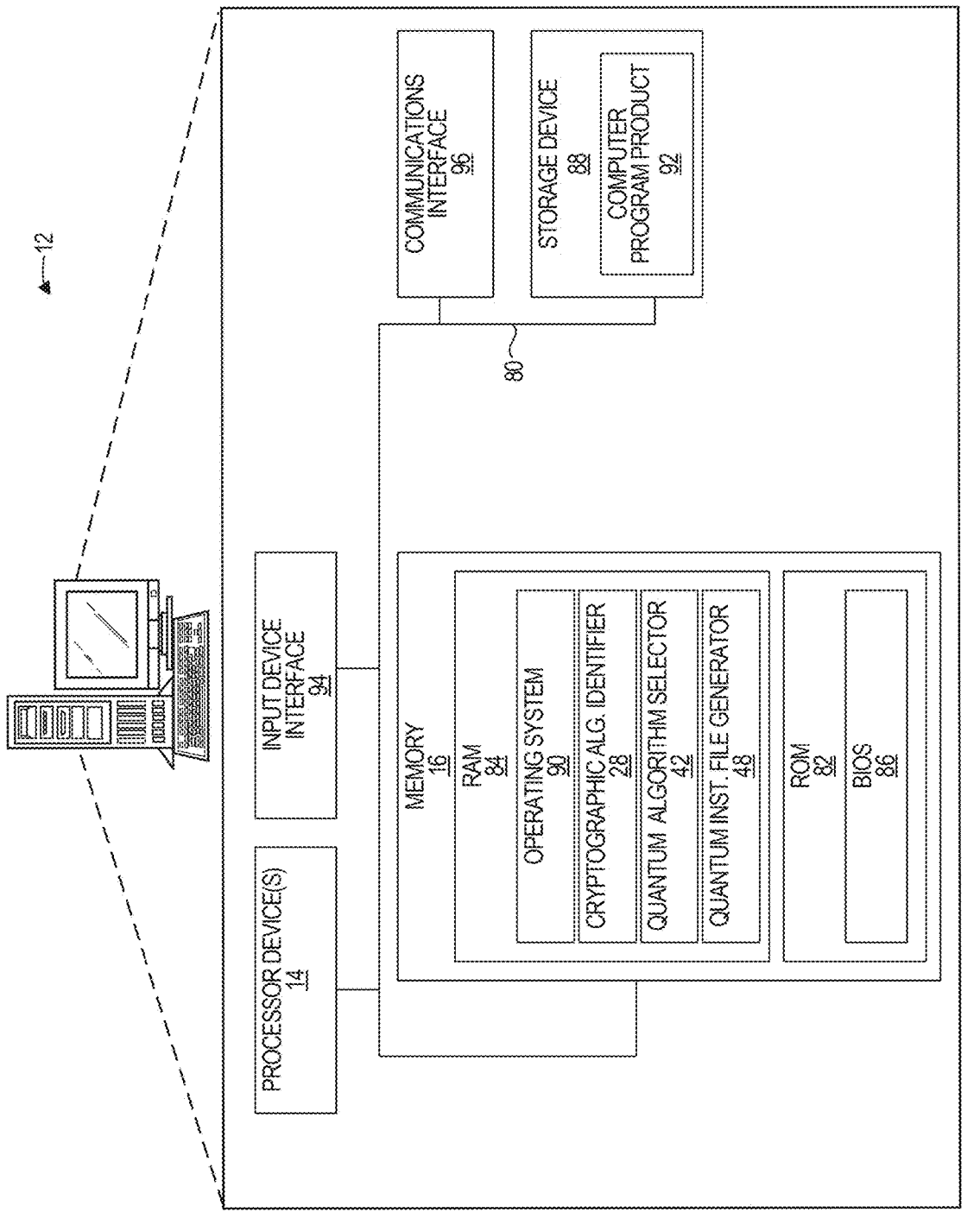
FIG. 4 is a block diagram of a computing system suitable for implementing examples disclosed herein.

FIG. 4 is a block diagram of the computing device 12 suitable for implementing examples disclosed herein according to one example. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device(s) 14, the memory 16, and a system bus 80. The system bus 80 provides an interface for system components including, but not limited to, the memory 16 and the processor device(s) 14. The processor device(s) 14 can be any commercially available or proprietary processor.

The system bus 80 may be any of several types of bus structures that may further interconnect to a memory bus (with or without a memory controller), a peripheral bus, and/or a local bus using any of a variety of commercially available bus architectures. The memory 16 may include non-volatile memory 82 (e.g., read-only memory (ROM), erasable programmable read-only memory (EPROM), electrically erasable programmable read-only memory (EEPROM), etc.), and volatile memory 84 (e.g., random-access memory (RAM)). A basic input/output system (BIOS) 86 may be stored in the non-volatile memory 82 and can include the basic routines that help to transfer information between elements within the computing device 12. The volatile memory 84 may also include a high-speed RAM, such as static RAM, for caching data.

The computing device 12 may further include or be coupled to a non-transitory computer-readable storage medium such as a storage device 88, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 88 and other drives associated with computer-readable media and computer-usable media may provide non-volatile storage of data, data structures, computer-executable instructions, and the like.

A number of modules can be stored in the storage device 88 and in the volatile memory 84, including an operating system 90 and one or more program modules, such as the instructions obtainer 18 (not illustrated), the cryptographic algorithm identifier 28, the quantum algorithm selector 42, and the QIF generator 48, which may implement the functionality described herein in whole or in part. All or a portion of the examples may be implemented as a computer program product 92 stored on a transitory or non-transitory computer-usable or computer-readable storage medium, such as the storage device 88, which includes complex programming instructions, such as complex computer-readable program code, to cause the processor device(s) 14 to carry out the steps described herein. Thus, the computer-readable program code can comprise software instructions for implementing the functionality of the examples described herein when executed on the processor device(s) 14. The processor device(s) 14, in conjunction with the instructions obtainer 18, the cryptographic algorithm identifier 28, the quantum algorithm selector 42 and the QIF generator 48 in the volatile memory 84 may serve as a controller, or control system, for the computing device 12 that is to implement the functionality described herein.

An operator, such as a user (not illustrated), may also be able to enter one or more configuration commands through a keyboard (not illustrated), a pointing device such as a mouse (not illustrated), or a touch-sensitive surface such as a display device. Such input devices may be connected to the processor device(s) 14 through an input device interface 94 that is coupled to the system bus 80 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 96 suitable for communicating with the network as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

obtaining, by a computing system comprising one or more processor devices, a set of instructions configured to execute on a classical computing system;

evaluating, by the computing system, the set of instructions to identify a cryptographic algorithm having a cryptographic algorithm type implemented by the set of instructions, wherein evaluating the set of instructions comprises identifying a pattern associated with the set of instructions, wherein the pattern is indicative of the cryptographic algorithm type;

based on the cryptographic algorithm type, selecting, by the computing system, a candidate quantum algorithm from a plurality of quantum algorithms, the candidate quantum algorithm comprising quantum instructions operable to attempt to breach the cryptographic algorithm;

translating, by the computing system, the set of instructions into cryptographic quantum instructions that implement the cryptographic algorithm; and generating, by the computing system, based on the cryptographic quantum instructions and the quantum instructions, a quantum instruction file that, when executed, attempts to breach the cryptographic algorithm.

2. The method of claim 1, further comprising causing, by the computing system, a quantum computing system to execute the quantum instruction file.

3. The method of claim 2, further comprising:

generating, by the quantum computing system, information that is indicative of whether the cryptographic algorithm was breached.

4. The method of claim 3, wherein the information indicates that the cryptographic algorithm was breached.

5. The method of claim 4, wherein the information identifies an amount of time required to breach the cryptographic algorithm.

6. The method of claim 3, further comprising sending, by the quantum computing system, the information to a destination.

7. The method of claim 1, wherein evaluating the set of instructions further comprises:

accessing, by the computing system, a plurality of known patterns, each known pattern of the plurality of known patterns corresponding to a different cryptographic algorithm type; and comparing, by the computing system, the pattern associated with the set of instructions to known patterns of the plurality of known patterns.

8. The method of claim 1, wherein translating the set of instructions into the cryptographic quantum instructions comprises:

identifying one or more variables utilized by the set of instructions; and generating, by the computing system, the cryptographic quantum instructions to utilize the one or more variables.

9. The method of claim 1, wherein the computing system is a classical computing system, and further comprising:

sending, by the computing system, the quantum instruction file to a quantum computing system.

10. The method of claim 1, wherein the cryptographic algorithm type comprises:

a Rivest-Shamir-Adleman (RSA) algorithm type;

a Secure Hash Algorithm 256-bit (SHA-256) algorithm type; or an Advanced Encryption Standard (AES) algorithm type.

11. The method of claim 1, wherein the candidate quantum algorithm comprises:

a Shor's algorithm; or a Grover's algorithm.

12. A computing device, comprising:

a memory; and a processor device coupled to the memory to:

obtain a set of instructions configured to execute on a classical computing system;

evaluate the set of instructions to identify a cryptographic algorithm having a cryptographic algorithm type implemented by the set of instructions, wherein, to evaluate the set of instructions, the processor device is further to identify a pattern associated with the set of instructions, wherein the pattern is indicative of the cryptographic algorithm type;

based on the cryptographic algorithm type, select a candidate quantum algorithm from a plurality of quantum algorithms, the candidate quantum algorithm comprising quantum instructions operable to attempt to breach the cryptographic algorithm;

translate the set of instructions into cryptographic quantum instructions that implement the cryptographic algorithm; and generate, based on the cryptographic quantum instructions and the quantum instructions, a quantum instruction file that, when executed, attempts to breach the cryptographic algorithm.

13. The computing device of claim 12, wherein the processor device is further to:

cause a quantum computing system to execute the quantum instruction file; and generate information that indicates that the cryptographic algorithm was breached and identifies an amount of time required to breach the cryptographic algorithm.

14. The computing device of claim 12, wherein to evaluate the set of instructions the processor device is further to:

access a plurality of known patterns, each known pattern of the plurality of known patterns corresponding to a different cryptographic algorithm type; and compare the pattern associated with the set of instructions to known patterns of the plurality of known patterns.

15. The computing device of claim 12, wherein to translate the set of instructions into the cryptographic quantum instructions, the processor device is further to:

identify one or more variables utilized by the set of instructions; and generate the cryptographic quantum instructions to utilize the one or more variables.

16. The computing device of claim 12, wherein to translate the set of instructions into the cryptographic quantum instructions, the processor device is further to:

identify one or more variables utilized by the set of instructions; and generate, by the computing system, the cryptographic quantum instructions to utilize the one or more variables.

17. A non-transitory computer-readable storage medium that includes executable instructions to cause a processor device to:

obtain a set of instructions configured to execute on a classical computing system;

evaluate the set of instructions to identify a cryptographic algorithm having a cryptographic algorithm type implemented by the set of instructions, wherein, to evaluate the set of instructions, the instructions further cause the processor device to identify a pattern associated with the set of instructions, wherein the pattern is indicative of the cryptographic algorithm type;

based on the cryptographic algorithm type, select a candidate quantum algorithm from a plurality of quantum algorithms, the candidate quantum algorithm comprising quantum instructions operable to attempt to breach the cryptographic algorithm;

translate the set of instructions into cryptographic quantum instructions that implement the cryptographic algorithm; and generate, based on the cryptographic quantum instructions and the quantum instructions, a quantum instruction file that, when executed, attempts to breach the cryptographic algorithm.

* * * * *